No. 762,598. PATENTED JUNE 14, 1904.
G. M. PECK.
ADJUSTABLE CLOTHES LINE.
APPLICATION FILED AUG. 11, 1902.
NO MODEL.
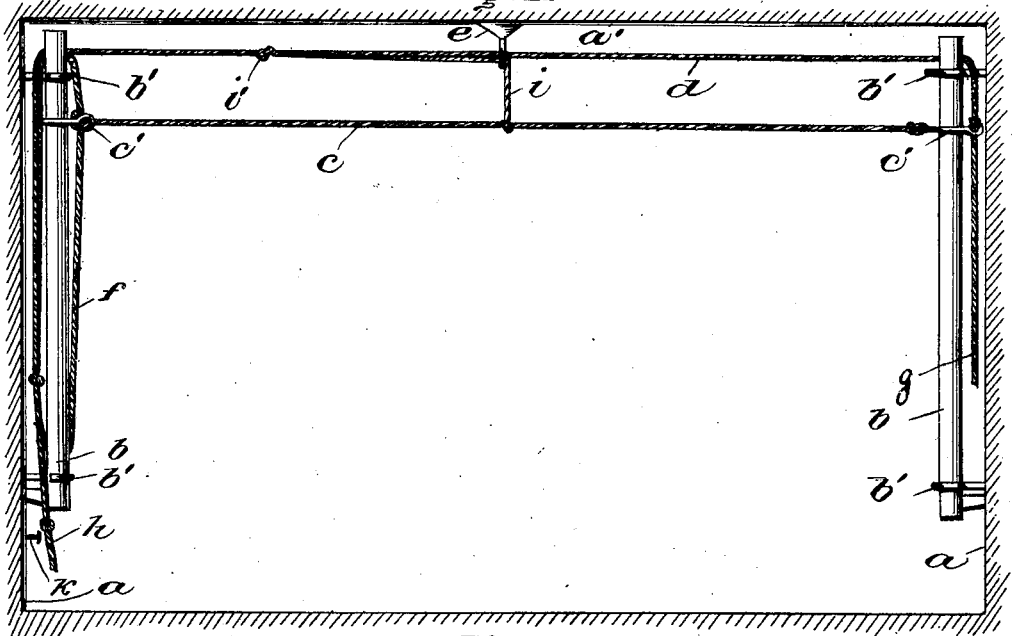
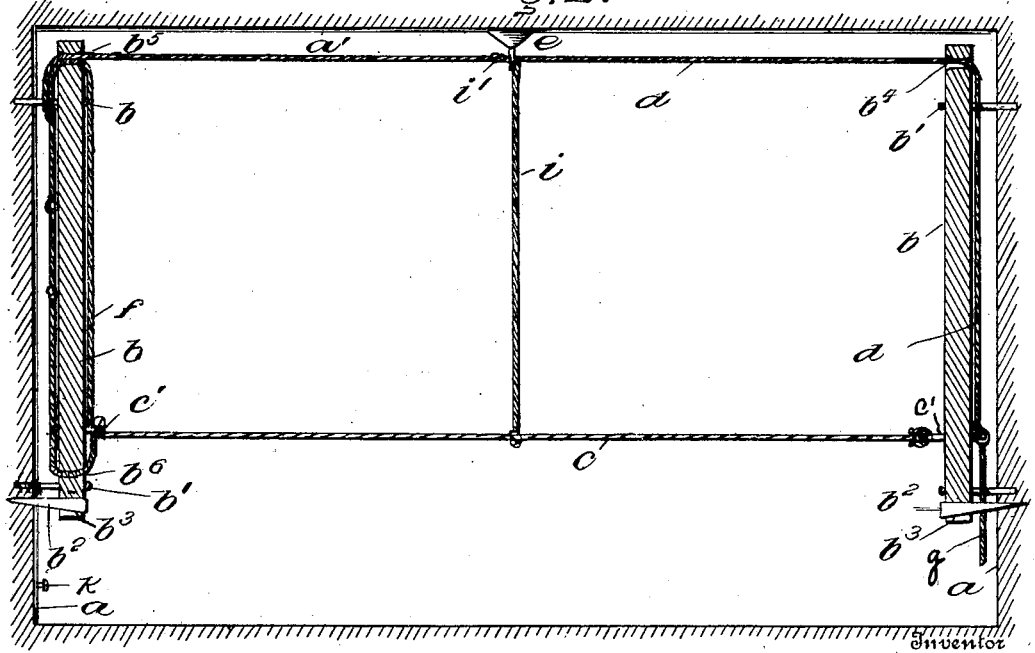
Witnesses
Inventor
George M. Peck,
by F. J. F. Johnson
Attorney No. 762,598. Patented June 14, 1904.

UNITED STATES PATENT OFFICE.

GEORGE MARVIN PECK, OF HOBOKEN, NEW JERSEY.

ADJUSTABLE CLOTHES-LINE.

SPECIFICATION forming part of Letters Patent No. 762,598, dated June 14, 1904.

Application filed August 11, 1902. Serial No. 119,251. (No model.)

*To all whom it may concern:*

Be it known that I, GEORGE MARVIN PECK, a citizen of the United States, residing at Hoboken, in the county of Hudson and State of New Jersey, have invented certain new and useful Improvements in Adjustable Clothes-Lines; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to improvements in adjustable clothes-lines; and it has for its object to provide suitable means for elevating and lowering the line on which the clothes are to be hung in order to facilitate the handling and removal of the clothes.

To this end the invention consists of certain details of construction and the combination of the several parts, as will be hereinafter fully described, and briefly stated in the claims.

In the drawings, Figure 1 is a view in elevation, showing the line attached to its supports and in elevated position; and Fig. 2, a vertical longitudinal section showing the line in its lower position.

Referring to both views, the letters $a\ a$ indicate the side supports, which may be the walls of a room or suitable standards or posts, and the letter $a'$ the ceiling of the room or a suitable beam connecting the supports $a\ a$.

The letters $b\ b$ indicate two vertical rods, which are supported from the walls or standards by any suitable means, the upper and lower ends being preferably supported by hooks or screw-eyes $b'\ b'$ and their lower ends receiving pins $b^2\ b^2$, passing through slots $b^3\ b^3$ in the ends of said rods to prevent turning.

$c$ indicates the line proper, on which the clothes are to be hung or suspended. Each end of the line is attached to a slidable ring $c'$, loosely encircling the vertical rods $b\ b$. Attached to one of the rings $c'$ is a line $d$, which passes through a hole or opening $b^4$ in one of said vertical rods, thence through a suitable guide $e$, attached to the ceiling or beam $a'$, and thence through a hole or opening $b^5$ in the other or opposite vertical rod. After passing through the opening $b^5$ the line $d$ is connected to a line $f$, which passes through a hole or opening $b^6$ at the lower end of said opposite rod. The line then passes upward and is secured to the slidable ring $c'$ on said rod. From the slidable ring the line $f$ passes upward and through the hole or opening $b^5$ back to its connecting-point with the line $d$.

Attached to one of the rings $c'$ is a line $g$ or other suitable means by which the line $c$ is lowered or brought from its elevated position to any desired point within easy reach of the person hanging the clothes.

$h$ indicates a line or other suitable means attached to the lines $d$ and $f$ at their point of juncture. By means of the line $h$ the line $c$ and the suspended clothes are raised to an elevated position. To prevent the line $c$ from sagging, I attach to the center thereof a line $i$, which passes up through the guide $e$ and is attached to the line $d$ at any suitable point, as at $i'$.

When the line $c$, carrying the clothes, is raised to its elevated position, the elevating-line $h$ is secured to any suitable means, as a pin $k$, to hold said line $c$ in its elevated position.

The operation of the device is obvious and needs no further description.

Various changes may be made in the details of construction without departing from the spirit of my invention or sacrificing the principle thereof—such, for instance, as making the lines $d$ and $f$ in one continuous piece.

Having thus fully described my invention, what I claim, and desire to secure by Letters Patent of the United States, is—

1. The combination with suitable supports, of vertical rods supported therefrom, a main line having its respective ends attached to slidable rings encircling said vertical rods, a line $d$ attached to one of said rings and passing through holes or openings in the upper ends of said vertical rods and connected with the other ring, a central supporting-line having one end attached to the main line and the other end attached to the line $d$, and a central guide through which said supporting-line passes, substantially as described.

2. The combination with suitable supports, of vertical rods supported therefrom, a main line having its respective ends attached to slidable rings encircling said vertical rods, a line $d$ attached to one of said rings and passing through holes or openings in the upper ends of said vertical rods, a line $f$ attached to the line $d$ and passing through holes or openings in the upper and lower ends of one of said vertical rods, said line $f$ being also attached to one of said slidable rings, and raising and lowering lines, whereby the main line may be elevated and lowered, substantially as and for the purpose set forth.

In testimony whereof I affix my signature in presence of two witnesses.

GEORGE MARVIN PECK.

Witnesses:
 FRANK J. BOLAND,
 ARTHUR T. GIFFORD.